United States Patent

Lanham

[15] 3,704,445
[45] Nov. 28, 1972

[54] DIGITAL READ OUT INDICATOR FOR VEHICLES

[72] Inventor: Richard R. Lanham, 904 Middleborough Road, Baltimore, Md. 21221

[22] Filed: July 20, 1971

[21] Appl. No.: 164,294

[52] U.S. Cl....................................340/62, 340/263
[51] Int. Cl. ..........................G08b 21/00, B60q 1/54
[58] Field of Search.............340/52, 53, 62, 263, 264

[56] References Cited

UNITED STATES PATENTS 3,597,730   8/1971   McClellan, Sr..............340/62
3,546,668   12/1970  Legler et al..................340/62
3,496,535   2/1970   Tyzack........................340/62

*Primary Examiner*—Alvin H. Waring
*Attorney*—Richard S. Shreve, Jr.

[57] ABSTRACT

Apparatus disposed in a vehicle for providing a digital read out indicator for displaying vehicular speed or engine revolutions comprising a mechanical shaft rotated at a speed corresponding to the vehicular speed or engine revolutions, means responsive to the shaft rotation to produce an electrical pulse train at a recurrence frequency proportional to the shaft rotational speed, and digital display means responsive to said pulse train to produce the desired display.

5 Claims, 3 Drawing Figures

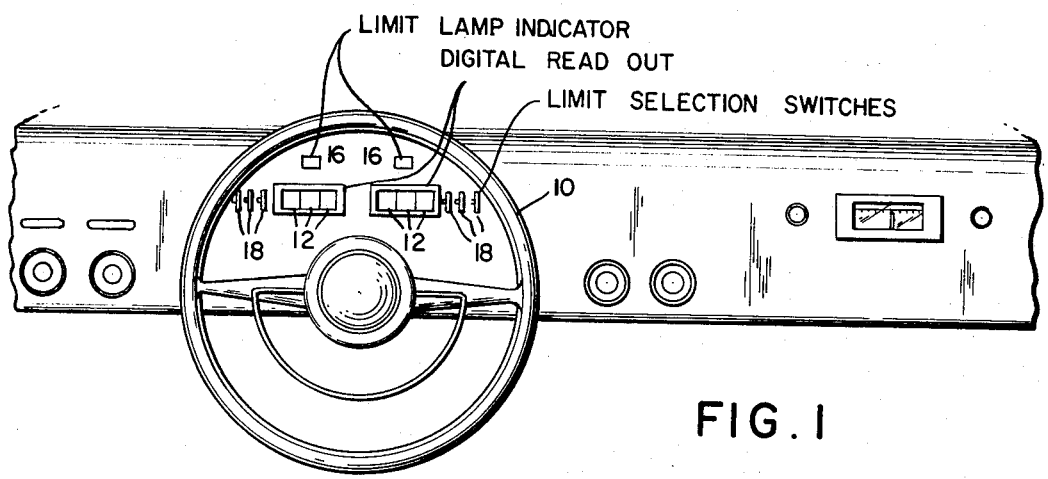
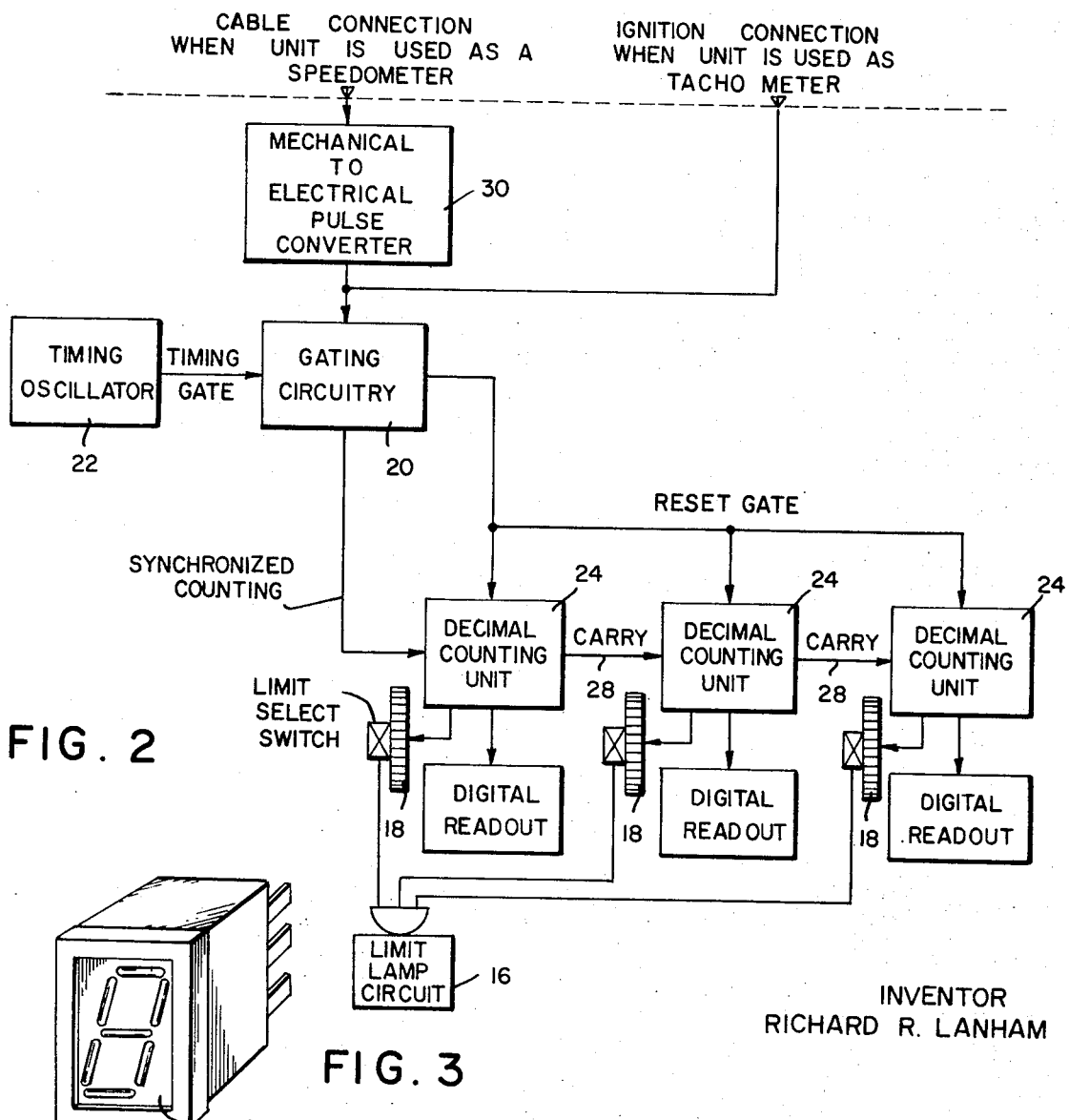
INVENTOR
RICHARD R. LANHAM

DIGITAL READ OUT INDICATOR FOR VEHICLES

FIELD OF INVENTION

My invention is directed toward apparatus which when installed in a vehicle will produce a digital display providing a reading of vehicular speed or engine rotation as expressed in revolutions per minute.

SUMMARY OF THE INVENTION

To this end, the vehicle is provided with a shaft which rotates at a speed which identifies the vehicular speed (as for example the speedometer cable) or the revolutions per minute of the engine (as derived from the drive shaft of the engine). Electromechanical means responsive to the shaft rotation produces an electrical pulse train having a recurrence frequency which varies with the speed of rotation and thus provides an electrical measure of the speed of rotation. Second means responsive to the pulse train produces a digital display signal. The digital display signal is supplied to a digital display device which then produces the desired reading as a visual digital display.

Two forms of such apparatus can be disposed side by side to produce simultaneous digital readings of vehicular speed and engine revolutions per minute.

BRIEF DESCRIPTION OF THE DRAWINGS

In the drawings:

FIG. 1 is a front detail view of an instrument panel in a vehicle in accordance with my invention;

FIG. 2 is a circuit diagram thereof; and

FIG. 3 shows a typical digital display element used in my invention.

DETAILED DESCRIPTION OF PREFERRED EMBODIMENTS

Referring now to FIGS. 1–3, an instrument panel 10 of a vehicle has a left hand section adapted to provide a digital reading of vehicular speed expressed in miles per hour and a right hand section adapted to provide a digital reading of engine rotation expressed in revolutions per minute.

The two sections each have three digital display elements 12 representing different powers of ten and being formed by decimal numeric electroluminescent panels 14 or the like as well as a limit lamp indicator 16 and three decimal thumb wheel limit select switches 18, one for each element 12. The purpose of the select switches is to select the range of speed or revolutions per minute which is of interest to provide a digital accurate comparison reading. The indicator 16 illuminates when the particular vehicular parameter becomes equal to and greater than the valve set in the limit switches 18.

Both sections function in the same manner but respond to different inputs. The left hand section responds to the rotations of a speedometer cable or other like flexible or rigid shaft. A mechanical to electrical pulse converter 30 converts the speed of rotation to an electrical pulse train having a recurrence frequency proportional to the speed of rotation. One method of doing this involves a perforated disc rotated by the cable. A light source disposed on one side of the disc will produce light which strikes a photo cell on the other side only when the light passes through the hole or holes in the disc whereby the photo cell produces pulses at a rate proportional to the speed of rotation.

The pulses yielded by converter 30 are fed to gating circuitry 20 as are fixed frequency pulses supplied to circuitry 20 by a clock oscillator 22. The output pulses yielded by circuitry 20 which are now synchronized and can be counted are supplied to successive decimal counting units 24 with suitable reset gates 26 and carry lines 28 to produce output signals fed to corresponding elements 12 to produce the desired read out.

The right hand section operates similarly except that the converter, which can be the ignition circuit, responds to a shaft rotating at a speed identifying the engine rotation in revolutions per minute.

The binary coded data available from the decimal counting unit 24, can provide an input to a computer control system, which would control other vehicular parameters, such as engine timing, spark advance, air flow, etc., and any parameter that would affect engine or vehicle efficiency, while the vehicle is actually being driven.

While I have described my invention with particular reference to the drawings, such is not to be considered as limiting its actual scope.

Having thus described this invention, what is asserted as new is:

1. In a vehicle having a shaft which turns at a speed designating the revolutions per unit time of the engine or the speed of the vehicle, in combination:
    first means responsive to the shaft rotation to produce a synchronized electrical pulse train having a variable recurrence frequency equal to the speed of the shaft;
    a digital display device replacing the vehicle speedometer; and
    second means including a plurality of decimal counting units coupled between said first means and said device to cause said device to produce a visual digital reading of the exact engine speed or the vehicular speed.

2. A vehicle as set forth in claim 1 having an additional combination of first means, second means and device whereby one device displays engine speed and the other device displays vehicular speed.

3. A vehicle as set forth in claim 1 wherein the second means includes a plurality of decimal indicating thumb limit switches.

4. A vehicle as set forth in claim 3 wherein the second means includes a limit lamp logic circuitry.

5. A vehicle as set forth in claim 1, wherein said first means includes means responsive to the shaft rotation to produce an electrical pulse train having a variable recurrence frequency proportional to the speed of the shaft; a clock oscillator and gating circuitry receiving said proportional pulse train and the output from said clock oscillator and producing said synchronized pulse train.

* * * * *